United States Patent
Toda et al.

(10) Patent No.: US 6,693,380 B2
(45) Date of Patent: Feb. 17, 2004

(54) AUTO LEVELING APPARATUS OF VEHICLE HEADLAMP

(75) Inventors: Atsushi Toda, Shizuoka (JP); Hideaki Takeuchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/274,929

(22) Filed: Oct. 21, 2002

(65) Prior Publication Data

US 2003/0076045 A1 Apr. 24, 2003

(30) Foreign Application Priority Data

Oct. 24, 2001 (JP) ............................. P. 2001-325793

(51) Int. Cl.⁷ ................................ B60Q 1/02
(52) U.S. Cl. .................. 315/82; 315/360; 362/466; 362/460
(58) Field of Search ............... 315/82, 78–80, 315/360; 362/460, 459, 465, 466; 701/49, 36; 307/10.8, 10.1

(56) References Cited

U.S. PATENT DOCUMENTS

| | | | |
|---|---|---|---|
| 6,183,118 B1 | 2/2001 | Toda et al. | 362/465 |
| 6,234,654 B1 * | 5/2001 | Okuchi et al. | 362/466 |
| 6,305,823 B1 * | 10/2001 | Toda et al. | 362/276 |
| 6,332,698 B1 | 12/2001 | Toda et al. | 362/465 |
| 6,357,898 B1 * | 3/2002 | Toda et al. | 362/466 |
| 6,430,521 B1 * | 8/2002 | Toda | 702/150 |
| 6,450,673 B1 * | 9/2002 | Toda et al. | 362/465 |
| 6,504,265 B2 * | 1/2003 | Toda et al. | 307/10.8 |

FOREIGN PATENT DOCUMENTS

| | | |
|---|---|---|
| GB | 2346710 | 8/2000 |
| GB | 2346982 | 8/2000 |
| GB | 2354314 | 3/2001 |

* cited by examiner

Primary Examiner—Haissa Philogene
(74) Attorney, Agent, or Firm—Fish & Richardson, P.C.

(57) ABSTRACT

An auto leveling apparatus which drives a motor only in case that a posture that has changed during stoppage becomes stable and the stable posture is different from the posture controlled at the last time thereby to reduce the number of operations of the motor. In an auto leveling apparatus of vehicle headlamp including a headlamp of which a light axis tilts up and down in relation to a car body by drive of a motor, a control unit for controlling the drive of the motor, a speed sensor for detecting speed, a pitch angle sensor for detecting pitch angle, and a memory for storing the pitch angle data detected by the pitch angle sensor, in which the control unit controls the drive of the motor, on the basis of the pitch angle data detected by the pitch angle sensor, so that the light axis of the headlamp has the constant inclination in relation to a road surface, the control unit controls the drive of the motor only in case that a posture (pitch angle data) that has changed once during stoppage becomes stable and the difference between its posture and a reference posture (reference pitch angle data) exceeds the predetermined value. Therefore, according to reduction of the number of operations of the motor, durability of the motor itself is improved.

4 Claims, 2 Drawing Sheets

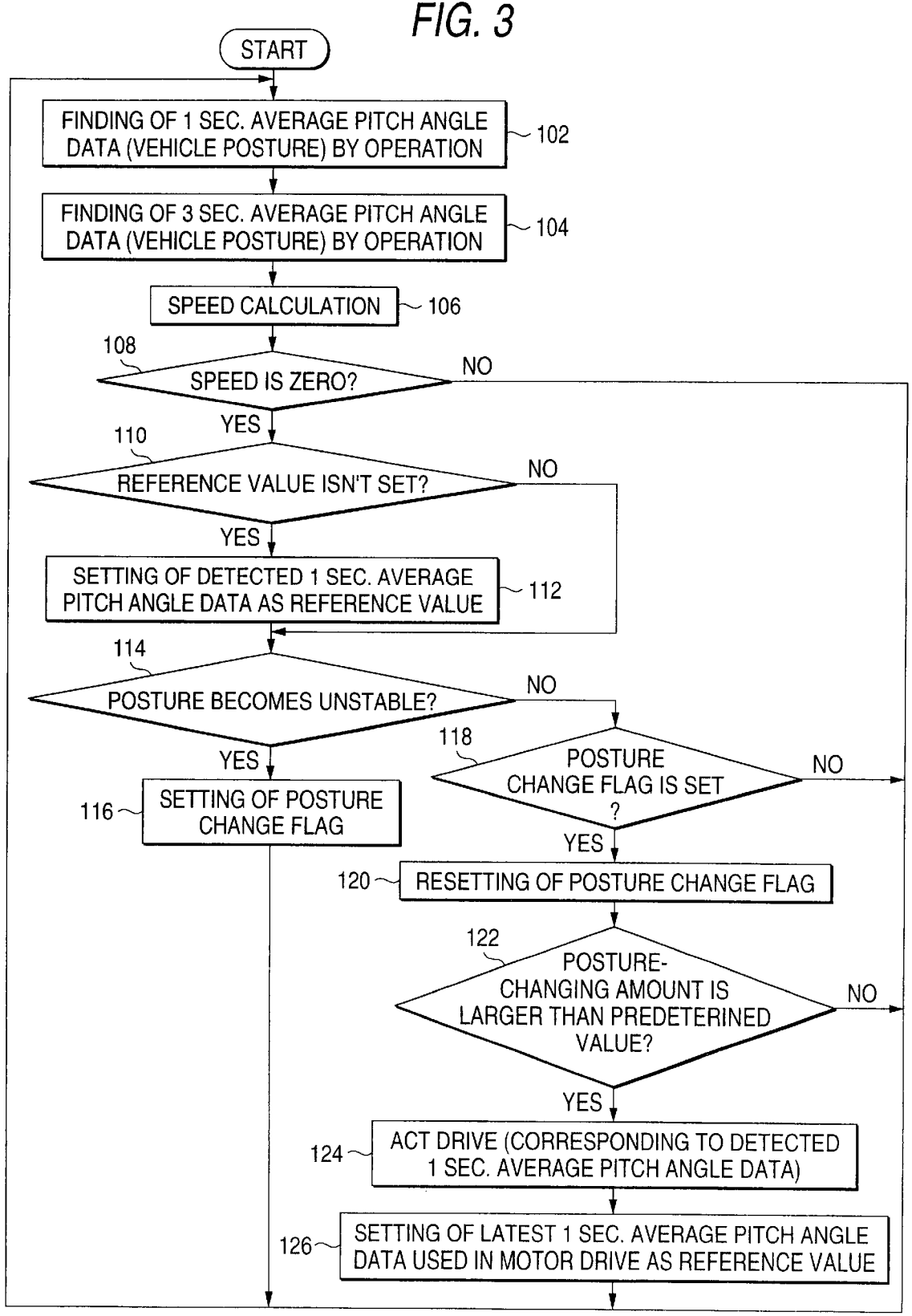

AUTO LEVELING APPARATUS OF VEHICLE HEADLAMP

BACKGROUND OF THE INVENTION

The present invention relates to an auto leveling apparatus of vehicle headlamp which automatically adjusts the inclination of a light axis of a headlamp (hereinafter referred to as auto leveling), on the basis of the inclination of a vehicle in the front and back direction (hereinafter referred to as a pitch angle), in the direction canceling the pitch angle, and particularly to an auto leveling apparatus which automatically adjusts the inclination of a light axis of a headlamp up and down on the basis of a pitch angle of a vehicle that is stopping.

A headlamp used in an auto leveling apparatus is so structured that a reflector into which a light source is attached is supported tiltably about a horizontal tilting axis in relation with respect to a lamp body and a light axis of the reflector (headlamp) can be tilted about the horizontal tilting axis by an actuator.

The conventional auto leveling apparatus is so structured that a pitch angle sensor, a speed sensor, a controller for controlling drive of an actuator on the basis of these detection signals, and the like are provided for a vehicle and the light axis of the headlamp (reflector) is adjusted so as to always become constant in relation to a road surface.

In case that according to the vehicle posture change caused by acceleration and deceleration during running of a vehicle or according to the load change caused by loading and unloading of goods or by getting on and off of passengers during stopping of the vehicle, the actuator is driven on a real time regardless of running or stopping of the vehicle and leveling is performed, the number of operations of the actuator is very large and the consumed power increases. Further, in such a case, drive mechanism components such as a motor, a gear, and the like require large durability, so that increase in cost is caused. Therefore, in order to decrease the number of drives of the actuator and provide at a low cost an auto leveling apparatus that can be used for a long time, an auto leveling apparatus (U.S. Pat. No. 6,183,118 or the like) has been proposed, which controls the drive of the actuator at regular intervals (for example, at intervals of 10 seconds) during the stoppage.

However, in the conventional auto leveling apparatus, the drive of the actuator is controlled on the basis of pitch angle data previously detected according to the interval time (for example, intervals of 10 seconds). Therefore, even if there is no change of static loading caused by getting on and off, since the light axis adjustment is performed according to the road surfaces, the number of operations of the actuator increases correspondingly thereby to cause a problem of a lowering of an actuator's life.

SUMMARY OF THE INVENTION

The invention has been made in view of the problem of the related art, and its object is to drive the actuator only in case that the vehicle posture that has changed once during stoppage becomes stable and its stable vehicle posture is different from a vehicle posture immediately after stoppage or a vehicle posture controlled at the last time thereby to decrease the number of operations of the actuator in the auto leveling apparatus as much as possible.

In order to achieve the object, according to the first aspect of the invention, an auto leveling apparatus of vehicle headlamp comprises: a headlamp of which a light axis tilts up and down in relation to a car body by drive of an actuator; a control unit for controlling the drive of the actuator; a speed sensor for detecting car speed; a pitch angle sensor for detecting car pitch angle; and a memory for storing the car pitch angle data detected by the pitch angle sensor, in which the control unit controls the drive of the actuator, on the basis of the pitch angle data detected by the pitch angle sensor, so that the light axis of the headlamp has the fixed inclination in relation to a road surface, the control unit controls the drive of the actuator only in case that a vehicle posture (pitch angle data) that has changed once during stoppage becomes stable and the difference between its stable vehicle posture and a reference posture (reference pitch angle data) exceeds the predetermined value.

Whether the vehicle is stopping or not is judged by the control unit on the basis of outputs detected by the speed sensor.

Further, regarding the stability of the vehicle posture (pitch angle data) that has changed once, as described in the second aspect of the invention, the control unit finds by the operation average pitch angle data on plural different moving times (moving time average pitch angle data), and in case that these data are nearly the same, the control unit judges the vehicle posture to become stable.

Namely, under the condition where static loading applied onto the vehicle is changing such as in case that passengers are getting on and off the vehicle, the detected pitch angle data changes momentarily and is not constant. On the other hand, under the condition where the constant static loading is applied onto the vehicle, the vehicle posture becomes stable and the detected pitch angle data becomes a constant value. Therefore, average pitch angle data on plural different moving times (moving time average pitch angle data), such as 1 sec. average pitch angle data and 3 sec. average pitch angle, are taken, and these data are compared with each other. In case that there is difference between the data, it is found that the vehicle posture does not become stable, and in case that there is no difference, it is found that the vehicle posture becomes stable. Therefore, in the invention, stability of the vehicle posture that is a condition necessary to drive-control the actuator is judged by whether there is difference between the average pitch angle data on the plural different moving times (moving time average pitch angle data).

Further, whether there is difference between the present posture and the original reference posture (reference pitch angle data) or not is judged by comparison between the present posture (pitch angle data) and the reference posture as a general rule. However, there is no corresponding reference posture before the first drive control of the actuator is executed. Therefore, as described in the third aspect of the invention, in a first actuator drive control after stoppage, the detected posture (moving time average pitch angle data) is compared with a posture immediately after stoppage (moving time average pitch angle data), and in an actuator drive control from the second on, the detected posture (1 sec. average pitch angle data) is compared with the posture (pitch angle data) used in the last actuator drive, whereby whether the posture becomes stable or not is judged. (Working) Since the drive of the actuator is controlled only during stoppage, the number of operations of the actuator is reduced correspondingly.

Further, since the actuator is not driven every time the posture changes but it is driven only in case that the posture becomes stable (since it is not driven before the posture does not become stable), the number of operations of the actuator is reduced correspondingly.

Further, during stoppage, even if the posture that has changed once becomes stable, as long as there is not difference over the predetermined value between the stabilized posture and the reference posture, the actuator is not driven. Therefore, the number of operations of the actuator is reduced correspondingly.

Since the number of operations of the actuator is thus reduced, the consumed power is saved and the wear of drive mechanism components of the actuator is reduced.

BRIEF DESCRIPTION OF THE DRAWINGS

FIG. 3 is a flowchart of a CPU that is a control unit in the same apparatus.

DETAILED DESCRIPTION OF THE PREFERRED EMBODIMENTS

Next, a mode for carrying out the invention will be described with reference to an embodiment.

Figure 1:
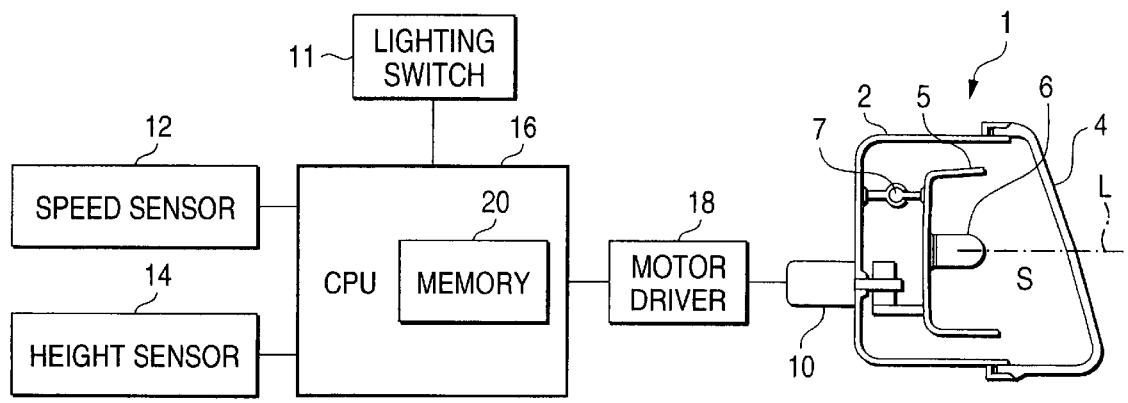
FIG. 1 is a whole constitutional view of an auto leveling apparatus of vehicle headlamp according to a first embodiment of the invention.
Figure 2A:
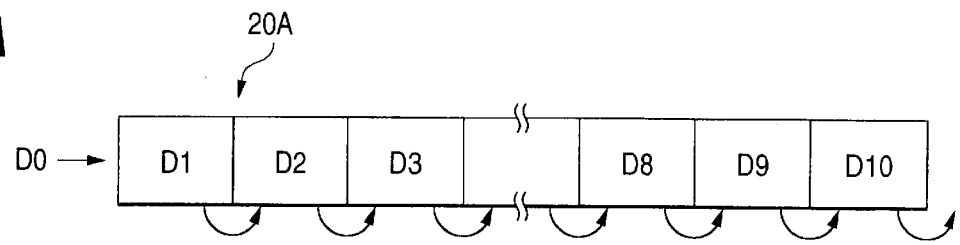
FIGS. 2(A,B,C,) is a diagram showing the constitution of a memory in the same apparatus.
Figure 2B:
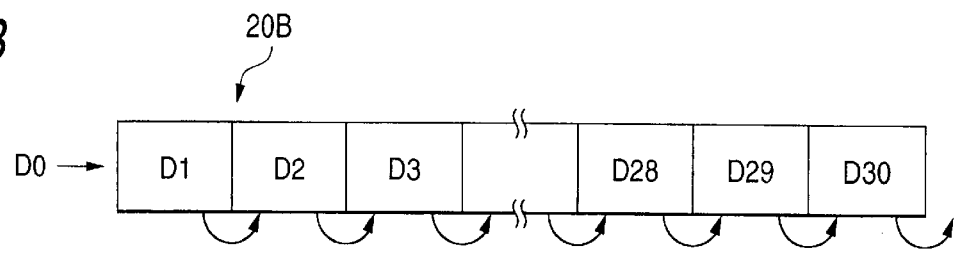

FIGS. 1 to 3 show one embodiment of the invention, in which FIG. 1 is a whole constitutional view of an auto leveling apparatus of vehicle headlamp according to a first embodiment of the invention, FIG. 2 is a diagram showing the constitution of a memory in the same apparatus, and FIG. 3 is a flowchart of a CPU that is a control unit in the same leveling apparatus.

Reference numeral 1 in FIG. 1 is an vehicle headlamp, in which a front lens 4 is attached to a front opening portion of a lamp body 2 to define a lighting room S. In the lighting room S, a paraboloidal reflector 5 to which a bulb 6 used as a light source is attached is supported so as to tilt about a horizontal tilting shaft (shaft perpendicular to a paper surface in FIG. 1) 7, and its tilt can be adjusted by a motor 10 used as an actuator.

An auto leveling apparatus of the headlamp 1 comprises mainly the motor 10 used as an actuator which adjusts the tilt of an light axis L of the headlamp 1 up and down; a lighting switch 11 of the headlamp 1; a speed sensor 12 that is a speed detecting unit for detecting speed; a height sensor 14 constituting a part of a vehicle pitch angle detecting unit; a CPU 16 that is a control unit which judges lighting-on and out of the headlamp, judges the vehicle running/stopping state on the basis of signals from the speed sensor 12, finds by the operation an vehicle pitch angle on the basis of signals from the height sensor 14, and outputs to a motor driver 18 a control signal for driving the motor 10 on the basis of this pitch angle data; and a memory 20 for storing the pitch angle data detected by the height sensor 14 and found by the CPU 16.

Upon reception of a signal from the height sensor 12, the CPU 16 judges whether the vehicle is stopping or running on the basis of this input signal, and controls drive of the motor 10 only during stopping. This is because more exact vehicle posture (pitch angle data) can be detected during stopping.

Further, the CPU 16, upon reception of a signal from the height sensor 14, finds by the operation the inclination in the front and back direction of the vehicle (pitch angle) on the basis of this signal corresponding to the displacement amount of a suspension. The vehicle shown in this embodiment adopts one sensor type in which the height sensor 14 is provided for only a right wheel of a rear wheel side suspension. From the height change amount detected by the height sensor 14, a vehicle pitch angle can be speculated. And, the CPU 16 output the control signal to the motor driver 18 so as to tilt a light axis L by the predetermined amount in the direction canceling this detected pitch angle.

Further, the memory 20 is a portion storing the pitch angle data detected by the height sensor 14 and found by the operation in the CPU 16. As shown in FIG. 2A, in a storing section 20A of the memory 20, ten data D1 to D10 obtained by 1 sec. sampling at intervals of 100 ms are stored. Further, in a storing section 20B of the memory 20, thirty data D1 to D30 obtained by 3 sec. sampling at intervals of 100 ms are stored. New data are taken respectively into the storing sections 20A and 20B at every 100 ms, and the oldest data are taken out of the storing sections 20A and 20B (the old data is rewritten to new data successively).

Further, the CPU 16 finds by the operation 1 sec. average pitch angle data and 3 sec. average pitch angle data from these data D1 to D30, and stores their data into the memory 20.

Figure 2C:
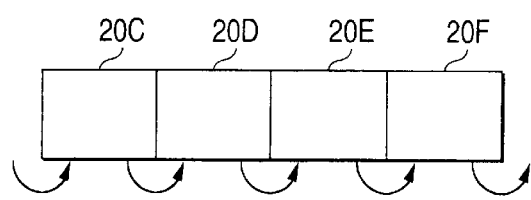

The memory 20 includes, as shown in FIG. 2C, a present pitch angle storing section 20C for storing the found present pitch angle data (1 sec. average pitch angle data and 3 sec. average pitch angle data); a before-1 sec.-pitch angle storing section 20D for storing the pitch angle data (1 sec. average pitch angle data and 3 sec. average pitch angle data) before 1 sec; a before-2 sec.-pitch angle storing section 20E for storing the pitch angle data (1 sec. average pitch angle data and 3 sec. average pitch angle data) before 2 seconds; and a before-3 sec.-pitch angle storing section 20F for storing the pitch angle data (1 sec. average pitch angle data and 3 sec. average pitch angle data) before 3 seconds. Every time one second elapses, 1 sec. average pitch angle data detected newly is written into the present pitch angle storing section 20C, the present pitch angle data stored in the present pitch angle storing section 20C is shifted into the before-1 sec.-pitch angle storing section 20D, the before-1 sec.-pitch angle data stored in the before-1 sec.-pitch angle storing section 20D is shifted into the before-2 sec.-pitch angle storing section 20E, the before-2 sec.-pitch angle data stored in the before-2 sec.-pitch angle storing section 20E is shifted into the before-3 sec.-pitch angle storing section 20F, and the before-3 sec.-pitch angle data stored in the before-3 sec.-pitch angle storing section 20F is deleted.

Further, the CPU 16, only in case that there is no difference between 1 sec. average pitch angle data and 3 sec. average pitch angle data, drives the motor 10. Namely, under the condition where static loading applied onto the vehicle is changing such as in case that passengers are getting on and off the vehicle (the condition where the vehicle posture becomes unstable), the detected pitch angle data changes momentarily and is not constant. On the other hand, under the condition where the constant static loading is applied onto the vehicle (the condition where the vehicle posture becomes stable), the detected pitch angle data becomes a constant value. Therefore, 1 sec. average pitch angle data and 3 sec. average pitch angle data which are average pitch angle data on two different moving times (one second and three seconds) (moving time average pitch angle data) are found by the operation, and these data are compared with each other. In case that there is no difference that is larger than the predetermined value (for example, 0.06 degrees) between these data (1 sec. average pitch angle data and 3 sec. average pitch angle data), the vehicle posture becomes stable. Therefore, the CPU 16 drives the motor 10. On the other, in case that there is difference that is larger than the predetermined value (for example, 0.06 degrees) between the data (1 sec. average pitch angle data and 3 sec. average pitch angle data), the vehicle posture does not become stable. Therefore, the CPU 16 does not drive the motor 10.

Further, the CPU 16 judges whether the lighting switch 11 is ON or OFF, and only in case that the lighting switch 11 is ON, the CPU 16 output the signal for driving the motor 10 to the motor driver 18.

Further, the CPU 16, only in case that there is difference exceeding the predetermined value between the detected average pitch angle data (for example, 1 sec. average pitch angle data) and the reference posture (the posture subjected to leveling by the last motor drive control, drives the motor 10.

Namely, in case that the vehicle posture specified by the detected average pitch angle data (for example, 1 sec. average pitch angle data) changes largely in relation to the vehicle posture subjected to the last leveling, leveling is required. However, in case that the vehicle posture specified by the detected average pitch angle data (for example, 1 sec. average pitch angle data) does not changes nearly in relation to the vehicle posture subjected to the last leveling (reference posture), since any influence is not given to visual recognition of driver, leveling is not required, so that the CPU does need to drive the motor 10. Therefore, only in case that there is the difference exceeding the degrees which seem to give the influence to the visual recognition of driver (for example, 0.06 degrees), leveling is performed (the motor 10 is driven). The average pitch angle data compared with the reference posture may be 3 sec. average pitch angle data in place of 1 sec. average pitch angle data.

Further, the reference posture for judging whether leveling (motor drive) is required or not, that is, the reference posture (reference pitch angle data) compared with the detected average pitch angle data is (pitch angle data corresponding to) the vehicle posture subjected to leveling by the last motor drive control as a general rule. However, in case that leveling (motor drive) has not been performed once, (pitch angle data corresponding to) the posture subjected to leveling does not exist. Therefore, in the first actuator drive control after stoppage, the vehicle posture detected immediately after stoppage (1 sec. average pitch angle data that is the moving time average pitch angle data) is taken as a reference posture (reference pitch angle data).

Next, the drive control of the motor 10 performed by the CPU 16 that is a control unit will be described with reference to a flowchart shown in FIG. 3.

Firstly, this routine works in a lamp lighting state where the headlamp lighting switch 11 is ON. In steps 102 and 104, the control unit (CPU) finds by the operation 1 sec. average pitch angle data and 3 sec. average pitch angle data based on outputs of the height sensor 14, respectively and stores their data into the memory 20. In a step 106, speed is found by the operation based on output of the speed sensor 12. In a step 108, whether the speed is zero or not is judged. In the step 108, in case of YES (in case that speed is zero, that is, the vehicle is stopping), the operation proceeds to a step 110, and whether a reference value used in a step 122 described later (a vehicle reference posture for judging whether leveling is required or not, that is, reference pitch angle data that is a reference posture compared with the detected average pitch angle data) has not been set is judged. On the other hand, in the step 108, in case of NO (in case that speed >0, that is, the vehicle is running), the operation returns to the step 102.

In the step 110, in case of YES (in case that the reference pitch angle data which is the reference posture has not been set), the operation proceeds to a step 112 in which the detected 1 sec. average pitch angle data is set as a reference pitch angle data (reference value), and then the operation proceeds to a step 114 in which whether the posture becomes stable or not is judged. On the other hand, in the step 110, in case of NO (in case that the actuator is driven in a step 124 described later and 1 sec. average pitch angle data has been already set as a reference pitch angle data which is the reference posture in a step 126), the operation does not pass through the step 112 but directly proceeds to the posture-stability judging step 114.

In the step 114, whether the difference between 1 sec. average pitch angle data and 3 sec. average pitch angle data is larger than the predetermined value is judged. In case of YES (in case that its difference is larger and the posture becomes unstable), the operation proceeds to a step 116, a posture change flag is set, and thereafter the operation returns to the step 102. On the other hand, in the step 114, in case of NO (the difference is smaller and the posture becomes stable), whether the posture change flag has been set or not is judged in a step 118. In the step 118, in case of YES (in case that the posture change flag has been set, that is, the posture that changed once becomes stable), the posture change flag is reset in a step 120 and thereafter the operation proceeds to a step 122.

In the step 122, whether the difference between the detected latest 1 sec. average pitch angle data and the reference value set in a step 126 described later (1 sec. average pitch angle data used in motor drive control in the last routine, or 1 sec. average pitch angle data immediately after stoppage which is the reference value set in the step 112 in case that the motor drive control has not been executed once) is larger than the predetermined value or not is judged. In the step 122, in case that YES (in case that the difference between the vehicle posture and the reference posture is larger than the predetermined value), the operation proceeds to a step 124, the drive of the motor 10 corresponding to the detected latest 1 sec. average pitch angle data is performed thereby to perform leveling. Thereafter, in a step 126, after the leveling amount in the step 124 (the latest 1 sec. average pitch angle data used in the motor drive control) is set as a reference value in the step 122, the operation returns to the step 102. Further, in the step 122, in case of NO (in case that there is little difference between the vehicle posture and the reference posture), the motor 10 is not driven but the operation returns to the step 102.

The CPU 16 controls the drive of the motor 10 on the basis of the latest 1 sec. average pitch angle data detected by the height sensor 14 during stoppage. However, when the vehicle is stopping on a sloping road or when it is stopping into a curbstone, in case that the vehicle posture (pitch angle data) that has changed once becomes stable and the difference between its stable posture and the reference posture (reference pitch angle data) is larger than the predetermined value, leveling (optical axis correction) can be performed on the basis of the pitch angle data during these unsuitable stoppage. However, in such a case, as shown in Japanese Patent Laid-Open No. 2001-180369, only once during the sequential stable running, the CPU controls the drive of the motor 10 on the basis of the pitch angle data detected during the stable running and corrects this wrong leveling (light axis correction), whereby there is no problem on running.

Further, in case that the pitch angle data during the vehicle stoppage is suitable (in case that the vehicle is not stopping in a unnatural mode such as a stopping mode on a sloping road or into a curbstone, the pitch angle data during stable running is nearly equal to the pitch angle data during the vehicle stoppage. Consequently, the light axis position after leveling has been performed on the basis of the pitch angle data during stable running is nearly the same as the light axis position after the last leveling has been performed during the vehicle stoppage.

In the embodiment, judgment of the vehicle posture stability is performed by the existence of the difference between two different moving time average pitch angle data (1 sec. average pitch angle data and 3 sec. average pitch angle data). However, the judgment of the vehicle posture stability may be performed by the existence of the difference among three different moving time average pitch angle data (for example, 1 sec. average pitch angle data, 2 sec. average pitch angle data and 3 sec. average pitch angle data), whereby the judgment of the vehicle posture stability can be performed more accurately.

Further, in the embodiment, auto leveling in a reflector movable type headlamp has been described, in which the reflector is provided tiltably for the lamp body 2 fixed to the car body. However, the invention can be similarly applied to an auto leveling apparatus in a unit movable type headlamp in which a lamp body reflector unit is provided tiltably for a lamp housing fixed to a car body.

As clear from the above description, according to the auto leveling apparatus of vehicle headlamp in the first aspect of the invention, the number of operations of the actuator is reduced thereby to save the consumed power, and wear of the drive mechanism components is also reduced thereby to improve durability.

Further, cost reduction is required in the latest vehicle lamp industry. As the number of operations of the actuator is reduced, an actuator's life becomes longer. Therefore, by using an actuator of a low cost which satisfies the using standard, cost reduction of the auto leveling apparatus can be realized.

What is claimed is:

1. An auto leveling apparatus of vehicle headlamp comprising:

a head lamp of which a light axis tilts up and down in relation to a car body by drive of an actuator;

a control unit for controlling the drive of said actuator;

a speed sensor for detecting car speed;

a pitch angle sensor for detecting car pitch angle; and a memory for storing the car pitch angle data detected by the pitch angle sensor, wherein said control unit controls the drive of said actuator, on the basis of the pitch angle data detected by said pitch angle sensor, so that the light axis of the headlamp has a fixed inclination in relation to a road surface, and said control unit controls the drive of the actuator only in case that a vehicle posture (pitch angle data) that has changed once during stoppage becomes stable and the difference between its stable vehicle posture and a reference posture (reference pitch angle data) exceeds a predetermined value.

2. The auto leveling apparatus of vehicle headlamp according to claim 1, wherein said control unit finds by the operation average pitch angle data on plural different moving times (moving time average pitch angle data), and in case that these data are nearly the same, the control unit judges the vehicle posture to become stable.

3. The auto leveling apparatus of vehicle headlamp according to claim 1, wherein said reference posture (reference pitch angle data), in a first actuator drive control after stoppage, is a posture immediately after stoppage (moving pitch angle data), and it, in actuator drive controls from the second on, is a posture used in the last actuator drive.

4. The auto leveling apparatus of vehicle headlamp according to claim 2, wherein said reference posture (reference pitch angle data), in a first actuator drive control after stoppage, is a posture immediately after stoppage (moving pitch angle data), and it, in actuator drive controls from the second on, is a posture used in the last actuator drive.

* * * * *